United States Patent
Iwamoto et al.

(10) Patent No.: US 7,321,224 B2
(45) Date of Patent: Jan. 22, 2008

(54) DC-DC CONVERTER WITH CLAMPING CAPACITOR AND OUTPUT WINDING FOR REDUCED OUTPUT VOLTAGE RIPPLE

(75) Inventors: Kazuyuki Iwamoto, Iwata-gun (JP); Masaya Yamashita, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 220 days.

(21) Appl. No.: 11/136,495

(22) Filed: May 25, 2005

(65) Prior Publication Data
US 2005/0286272 A1    Dec. 29, 2005

(30) Foreign Application Priority Data
Jun. 24, 2004    (JP) .............. 2004-186549

(51) Int. Cl.
G05F 1/253    (2006.01)
G05F 1/613    (2006.01)
G05F 1/00     (2006.01)
(52) U.S. Cl. ............... 323/262; 323/282; 323/229; 323/222
(58) Field of Classification Search ........... 323/222, 323/262, 282, 290, 223–225, 229, 230, 232–234, 323/247, 259, 261–263, 293, 328–329, 332, 323/338, 346, 351–352, 344–345, 355; 363/56.12, 363/56.05, 56.08, 56.11
See application file for complete search history.

(56) References Cited

U.S. PATENT DOCUMENTS

| | | | |
|---|---|---|---|
| 4,829,232 A | * | 5/1989 | Erickson, Jr. .............. 323/290 |
| 5,432,431 A |   | 7/1995 | Vinciarelli et al. |
| 5,633,579 A | * | 5/1997 | Kim .............. 323/222 |
| 5,736,842 A | * | 4/1998 | Jovanovic .............. 323/222 |
| 5,943,200 A | * | 8/1999 | He .............. 361/56 |
| 6,429,628 B2 |   | 8/2002 | Nakagawa |
| 6,469,481 B1 | * | 10/2002 | Tateishi .............. 323/282 |
| 6,710,582 B2 |   | 3/2004 | Watanabe |
| 6,987,675 B2 | * | 1/2006 | Jovanovic et al. ....... 363/21.01 |
| 2001/0011885 A1 |   | 8/2001 | Nakagawa |
| 2003/0111892 A1 |   | 6/2003 | Neilson et al. |
| 2003/0205990 A1 | * | 11/2003 | Wittenbreder, Jr. ......... 323/222 |

FOREIGN PATENT DOCUMENTS

JP    A 6-284707    10/1994

(Continued)

Primary Examiner—Bao Q. Vu
Assistant Examiner—Harry Behm
(74) Attorney, Agent, or Firm—Oliff & Berridge, PLC

(57) ABSTRACT

A DC-DC converter is structured such that a main switching element has one terminal connected to one terminal of a DC power supply and has the other terminal connected to one terminal of a first winding of a resonance coil, a choke coil has one terminal connected to one terminal of a second winding of the resonance coil and has the other terminal connected to one terminal of an output capacitor, a rectifier diode has one terminal connected to the connection of the first and second windings and has the other terminal connected to the other terminal of the output capacitor and also to the other terminal of the DC power supply, and a series circuit including an auxiliary switching element and a clamping capacitor is provided between the other terminal of the DC power supply and the connection of the main switching element and the first winding.

8 Claims, 14 Drawing Sheets

FOREIGN PATENT DOCUMENTS

| JP | A 2002-262551 | 9/2002 |
| JP | A 2002-262552 | 9/2002 |
| JP | A 2003-189602 | 7/2003 |
| JP | A 2004-023825 | 1/2004 |
| JP | A 2004-186549 | 7/2004 |

* cited by examiner

[ t0- t1 ]

[ t1- t2 ]

[t2-t3]

[t3-t4]

[t4 − t5]

[t5 − t6]

[t6-t7]

[t7-t8]

[t8−t9]

[t9−t10]

[t10 - t1]

[ t 10 - t 11 ]

[ t 11 - t 1 ]

DC-DC CONVERTER WITH CLAMPING CAPACITOR AND OUTPUT WINDING FOR REDUCED OUTPUT VOLTAGE RIPPLE

BACKGROUND OF THE INVENTION

1. Field of the Invention

The present invention relates to a DC-DC converter, and more particularly to a DC-DC converter, in which switching loss and output ripple voltage can be reduced.

2. Description of the Related Art

A DC-DC converter, which converts an input DC voltage into an intended stable DC voltage by switching-control of a semi-conductor device, is highly efficient and can be easily reduced in dimension and weight, and therefore constitutes a vital part in power supplies in various electronic apparatuses, control of electric machinery based on inverter technology, and circuits for lighting various discharge lamps.

FIG. 11 is a circuitry of a conventional step-down DC-DC converter 100. The DC-DC converter 100 includes a field effect transistor Q1, a rectifier diode D3, a choke coil L1, an output capacitor C5, and a control circuit 102, where E is a DC power supply with a voltage Vi, R1 is a resistor as load, and C1 is a junction capacitance between the drain and the source of the field effect transistor Q1.

The DC power supply E has its positive terminal connected to the drain terminal of the field effect transistor Q1 and has its negative terminal grounded. The source terminal of the field transistor Q1 is connected to the cathode terminal of the rectifier diode D3 and to one terminal of the choke coil L1 which has the other terminal thereof connected to one terminal of the output capacitor C5. The other terminal of the output capacitor C5 and the anode terminal of the rectifier diode D3 are grounded. A detection terminal of the control circuit 102 is connected to the other terminal of the choke coil L1, which is the terminal connected to the resistor R1, and an output terminal of the control circuit 102 is connected to the gate terminal of the field effect transistor Q1.

The DC-DC converter 100 operates as follows. Assuming that DC-DC converter 100 is in a steady state condition with the field effect transistor Q1 turned off, when the field effect transistor Q1 is turned on, current flows from the DC power supply E toward the choke coil L1 via the field effect transistor Q1, and a voltage of the choke coil L1 at a side thereof connected to the resistor R1 is smoothed by the output capacitor C5 and applied to the resistor R1. While the field effect transistor Q1 is turned on, energy according to the current is stored in the choke coil L1. And, when the field effect transistor Q1 is turned off, electromotive force is generated at both terminals of the choke coil L1, current maintained by the electromotive force commutates via the rectifier diode D3, and the energy stored is supplied to the resistor R1.

With repetition of the operation described above, a voltage according to a duty ratio [on-time/(on-time and off-time)] of the field effect transistor Q1 is generated at both terminals of the resistor R1. Since the control circuit 102 maintains a constant output voltage independently of variance of the input voltage Vi and the resistor R1, pulse width modulation (PWM) control is performed, where the duty ratio of the field effect transistor Q1 is varied based on the output voltage detected.

In the DC-DC converter 100, at the moment when the field effect transistor Q1 turns on and turns off, a transition period, in which a drain-to-source voltage and a drain current respectively having a non-zero value are present concurrently, appears due to the drain-source junction capacitance C1 and parasitic inductance by wires, whereby switching loss is caused. Since the switching loss is increased due to a higher frequency in performing on-off control, a serious problem is raised if frequency is increased for the purpose of reducing the inductance of a choke coil and the capacitance of an output capacitor to thereby reduce dimension and weight of an apparatus. Also, another problem is that when a reverse bias is applied to the rectifier diode D3 due to the field effect transistor Q1 turned off, a large recovery current is caused to flow through the rectifier diode D3 from the cathode terminal toward the anode terminal at a reverse recovery time, and a large loss is incurred.

What is called "soft-switching technique" is conventionally known, which leverages resonance thereby reducing the switching loss and the loss resulting from the recovery current. For example, a resonant circuitry using junction capacitance of switching and rectifying elements as shown in FIG. 12 is disclosed in order to deal with an extensive variance in output and input voltages (refer to, for example, Japanese Patent Application Laid-Open No. 2003-189602).

Referring to FIG. 12, a DC-DC converter 200 is structured such that the source terminal of a field effect transistor Q1 is connected, via a resonance coil L2, to a connecting portion of a rectifier diode D3 and a choke coil L1, a series circuit consisting of the resonance coil L2 and the rectifier diode D3 is connected in parallel to a series circuit consisting of a clamping capacitor C4 and a field effect transistor Q2, a diode D2 and a capacitor C6 are respectively connected in parallel to the field effect transistor Q2 at the drain and source terminals, a diode D1 and a capacitor C1 are respectively connected in parallel to the field effect transistor Q1 at the drain and source terminals, and a diode 5 is connected in parallel to a series circuit consisting of the field effect transistor Q1 and the resonance coil L2. In the DC-DC converter 200, zero-voltage switching is achieved by resonance caused by the resonance coil L2 and parallel capacitances formed respectively between both terminals of the field effect transistor Q1 and between both terminals of the field effect transistor Q2, and losses and noises can be reduced.

In such a DC-DC converter 200 arranged as shown in FIG. 12, however, when the duty ratio is reduced, sufficient energy cannot be stored in a resonance coil L2, and the voltage at a clamping capacitor C4 is lowered, and if this state goes on, the voltage at the clamping capacitor C4 is eventually reversed thus resulting in prohibiting reset of the resonance coil L2. Also, since the above-described DC-DC converter produces a larger output ripple voltage than the DC-DC converter 100 shown in FIG. 11, the capacitance of an output capacitor must be increased, and/or a low-pass filter must be added, thus inviting a cost increase.

SUMMARY OF THE INVENTION

The present invention has been made in light of the above problems, and it is an object of the present invention to provide a DC-DC converter which enables reduction of switching loss, is capable of dealing with an extensive variance in input and output voltage, and which enables easy reduction of ripple voltage.

In order to achieve the object described above, according to a first aspect of the present invention, there is provided a DC-DC converter which comprises: a main switching element; an auxiliary switching element; a rectifier diode; a choke coil; an output capacitor; a clamping capacitor; and a resonance coil. In the DC-DC converter described above, the resonance coil includes first and second windings, the main switching element has one terminal thereof connected to one terminal of a DC power supply and has the other terminal thereof connected to one terminal of the first winding, the choke coil has one terminal thereof connected to one terminal of the second winding and has the other terminal thereof connected to one terminal of the output capacitor, the rectifier diode has one terminal thereof connected to a connecting portion of the first and second windings and has the other terminal thereof connected to the other terminal of the output capacitor and also to the other terminal of the DC power supply, and a series circuit including the auxiliary switching element and the clamping capacitor is provided between the other terminal of the DC power supply and a connecting portion of the main switching element and the first winding, whereby a step-down operation is performed.

In the first aspect of the present invention, the DC-DC converter may further comprise a first diode connected in parallel to the clamping capacitor.

In the first aspect of the present invention, the DC-DC converter may further comprise a second diode provided between the DC power supply and a connecting portion of the first winding of the resonance coil and the rectifier diode.

In the first aspect of the present invention, the DC-DC converter may further comprise a capacitor connected in parallel to the main switching element.

In the first aspect of the present invention, the DC-DC converter may further comprise a capacitor connected in parallel to the choke coil.

According to a second aspect of the present invention, there is provided a DC-DC converter which comprises: a main switching element; an auxiliary switching element; a rectifier diode; a choke coil; an output capacitor; a clamping capacitor; and a resonance coil. In the DC-DC converter described above, resonance coil includes first and second windings, the choke coil has one terminal thereof connected to one terminal of a DC power supply and has the other terminal thereof connected to one terminal of the second winding, the rectifier has one terminal thereof connected to one terminal of the first winding and has the other terminal thereof connected to one terminal of the output capacitor, the main switching element has one terminal thereof connected to a connecting portion of the first and second windings and has the other terminal thereof connected to the other terminal of the output capacitor and also to the other terminal of the DC power supply, and a series circuit including the auxiliary switching element and the clamping capacitor is provided between the one terminal of the output capacitor and a connecting portion of the main switching element and the first winding, whereby a step-up operation is performed.

In the second aspect of the present invention, the DC-DC converter may further comprise a first diode connected in parallel to the clamping capacitor.

In the second aspect of the present invention, the DC-DC converter may further comprise a second diode provided between the DC power supply and a connecting portion of the first winding of the resonance coil and the rectifier diode.

In the second aspect of the present invention, the DC-DC converter may further comprise a capacitor connected in parallel to the main switching element.

In the second aspect of the present invention, the DC-DC converter may further comprise a capacitor connected in parallel to the choke coil.

According to the DC-DC converter of the present invention, the resonance coil includes the first and second windings, and zero-switching is realized by the series circuit composed of the first winding, the clamping capacitor and the auxiliary switching element, whereby the switching loss of the main and auxiliary switching elements and the recovery current of the rectifier diode can be reduced, and PWM control can be performed in an extensive input and output voltage range. Also, a voltage across both terminals of the choke coil can be controlled by induced electromotive force generated at the second winding of the resonance coil, whereby a ripple voltage can be reduced without adding a low-pass filter and increasing the capacitance of the capacitors, which contributes to reducing cost and dimension.

Further, the first diode is connected in parallel to the clamping capacitor, whereby the voltage at the clamping capacitor is prevented from getting reversed. Consequently, even if the duty ratio of the main switching element is extremely small, the DC-DC converter operates normally. And, the second diode is provided between the DC power supply and the connecting portion of the rectifier diode and resonance coil, whereby generation of ringing is held.

BRIEF DESCRIPTION OF THE DRAWINGS

FIGS. 4A to 4D are current state diagrams for the operation of the DC-DC converter of FIG. 1, wherein FIG. 4A is for a period t0 to t1 in the timing chart of FIG. 3, FIG. 4B is for a period t1 to t2, FIG. 4C is for a period t2 to t3, and FIG. 4D is for a period t3 to t4;

FIGS. 5A to 5D are current state diagrams for the operation of the DC-DC converter of FIG. 1, wherein FIG. 5A is for a period t4 to t5 in the timing chart of FIG. 3, FIG. 5B is for a period t5 to t6, FIG. 5C is for a period t6 to t7, and FIG. 5D is for a period t7 to t8;

FIGS. 6A and 6B are current state diagrams for the operation of the DC-DC converter of FIG. 1, wherein FIG. 6A is for a period t8 to t9 in the timing chart of FIG. 3, and FIG. 6B is for a period t9 to t10;

DETAILED DESCRIPTION OF THE PREFERRED EMBODIMENTS

Figure 1:
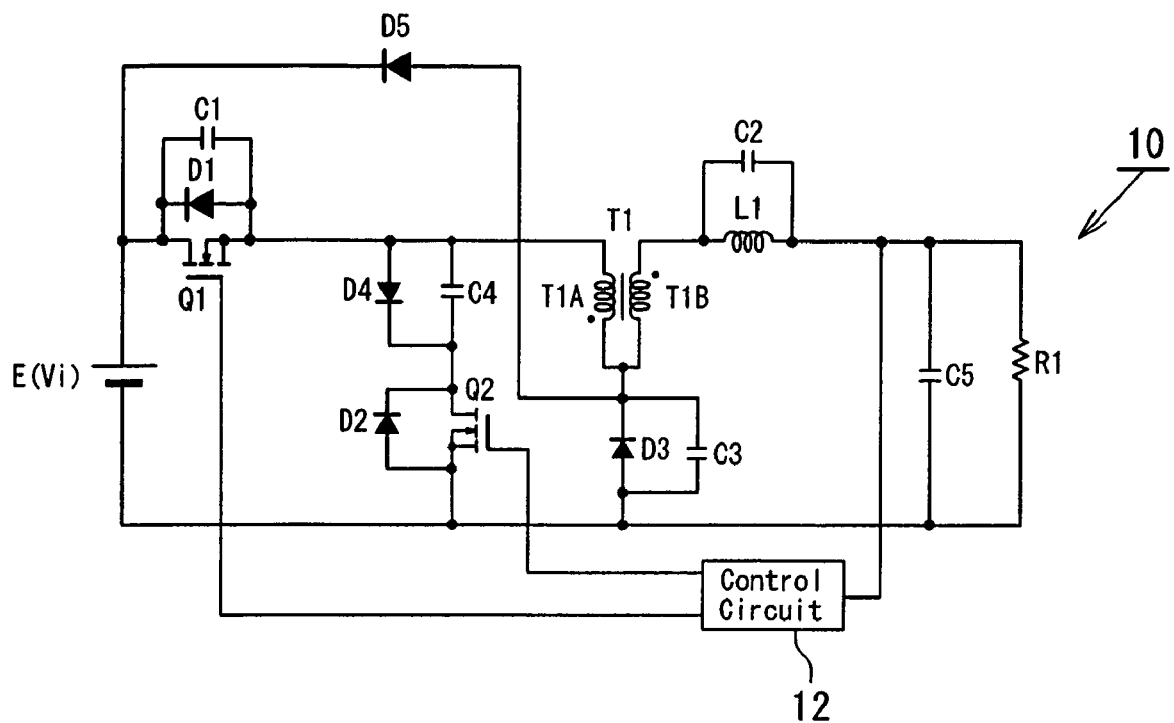
FIG. 1 is a circuit diagram of a step-down DC-DC converter according to a first embodiment of the present invention.

Preferred embodiments of the present invention will hereinafter be described with reference to the accompanying drawings.

Referring to FIG. a DC-DC converter 10 according to a first embodiment of the present invention includes a main switching element Q1, a choke coil L1, an output capacitor C5, a rectifier diode D3, a resonance coil T1, an auxiliary switching element Q2, a clamping capacitor C4, and a control circuit 12, wherein E is a power supply with a voltage Vi, and R1 is a resistor as load.

The main switching element Q1 is preferably constituted by a field effect transistor, and a diode D1 and a capacitor C1 which are connected in parallel to the main switching element Q1 represent a body diode and drain-source junction capacitance, respectively, incorporated in the field effect transistor. The auxiliary switching element Q2 is preferably constituted by a field effect transistor, and a diode D2 connected to the auxiliary switching element Q2 represents a body diode incorporated in the field effect transistor. A capacitor C3 connected in parallel to the rectifier diode D3 represents a junction capacitance of the rectifier diode D3. The present invention is not limited to any specific kinds of switching elements, and for example, the switching elements Q1 and Q2 may alternatively be constituted by bipolar transistors, insulated gate bipolar transistor (IGBT), and the like. And, the aforementioned capacitors C1 and C3, diodes D1 and D2 may be constituted by respective external components.

The DC-DC converter 10 is a step-down DC-DC converter, where the main switching element Q1 has its drain terminal connected to the positive terminal of the DC power supply E and has its source terminal connected to one terminal of a first winding T1A of the resonance coil T1, the other terminal of the first winding T1A is connected to the cathode terminal of the rectifier diode D3 and to one terminal of a second winding T1B of the resonance coil T1, the other terminal of the second winding T1B is connected to one terminal of the choke coil L1, the other terminal of the choke coil L1 is connected to one terminal of the output capacitor C5, the negative terminal of the DC power supply E and the other terminal of the output capacitor C5 are grounded, a series circuit consisting of the clamping capacitor C4 and the auxiliary switching element Q2 is connected between the negative terminal of the DC power supply E and a connecting portion of the main switching element Q1 and the first winding T1A, and the control circuit 12 has its detection terminal connected to the other terminal of the choke coil L1 and has its output terminal connected to respective gate terminals of the main and auxiliary switching elements Q1 and Q2. Further, in the step-down DC-DC converter 10, a first diode D4 is connected in parallel to the clamping capacitor C4, and a second diode D5 is connected between the positive terminal of the DC power supply E and a connecting portion of the resonance coil T1 and the rectifier diode D3. The first and second windings T1A and T1B of the resonance coil T1 are magnetically connected to each other, and are wound so as to define a predetermined turn ratio of $N_{AB}$ (=number of turns of the T1B/number of turn of the T1A) and to have respective polarities reversed.

Figure 2:
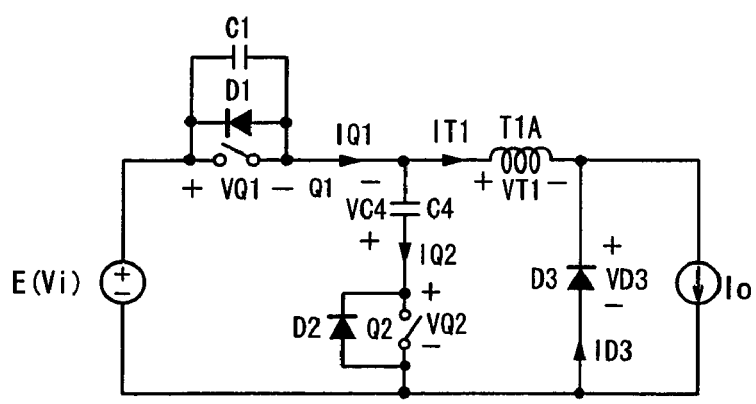
FIG. 2 is a simplified circuit diagram of the DC-DC converter of FIG. 1.

An operation of the DC-DC converter 10 will be described. For ease of understanding the basic operation, it is assumed that: the choke coil L1 has a sufficiently large inductance and functions virtually as a constant current source Io; the clamping capacitor C4 has a capacitance sufficiently larger than the junction capacitance of the auxiliary switching element Q2 and functions virtually as a constant voltage source to supply a substantially constant voltage VC4; on-resistances of the main and auxiliary switching elements Q1 and Q2 are substantially zero; forward voltages of respective diodes are substantially zero; the rectifier diode D3 is an ideal element having no junction capacitance; and the first and second diodes D4 and D5 are not disposed. Based on the above assumption, the circuit diagram of FIG. 1 is turned into a simplified circuit diagram as shown in FIG. 2. The second winding T1B of the resonance coil T1, the junction capacitance C3 of the rectifier diode D3, and the first and second diodes D4 and D5 are omitted in FIG. 2, and operations of the second winding T1B and the first and second diodes D4 and D5, and influence of the junction capacitance C3 will be discussed later separately.

Referring to FIG. 2, Vi is a constant DC voltage from the DC power supply E, and Io is a constant current maintained by the constant current source Io (the symbol Io refers to both the constant current and the constant current source as appropriate). VQ1 is a voltage across both terminals of the main switching element Q1, VQ2 is a voltage across both terminals of the auxiliary switching element Q2, VD3 is a voltage across both terminals of the rectifier diode D3, and VT1 is a voltage across both terminals of the first winding T1A of the resonance coil T1, where a direction from − toward + is defined as a positive direction. Also, IQ1 is a current flowing through the main switching element Q1, IQ2 is a current flowing through the auxiliary switching element Q2, ID3 is a current flowing through the rectifier diode D3, and IT1 is a current flowing through the first winding T1A of the resonance coil T1, where a direction indicated by an arrow is defined as a positive direction. IQ1 includes currents flowing through the junction capacitance C1 and the body diode D1 of the main switching element Q1, and IQ2 includes a current flowing through the body diode D2 of the auxiliary switching element Q2.

In the DC-DC converter 10, the control circuit 12 performs PWM control so that the main and auxiliary switching elements Q1 and Q2 are alternately turned on with a period provided between respective on-periods when both the main and auxiliary switching elements Q1 and Q2 are off.

The DC-DC converter 10 operates as follows.

Figure 3:
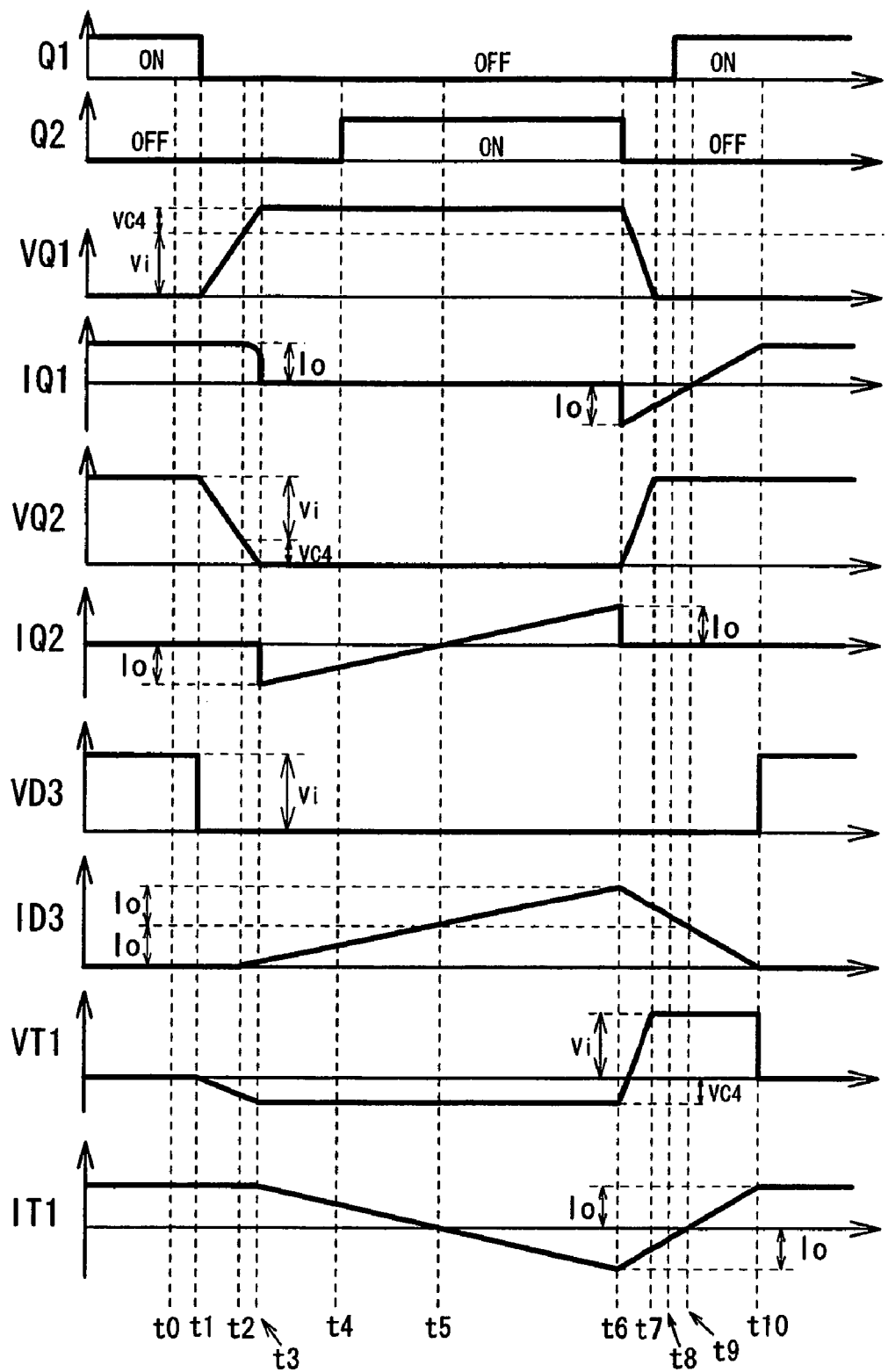
FIG. 3 is a timing chart for an operation of the DC-DC converter of FIG. 1.
Figure 4A:
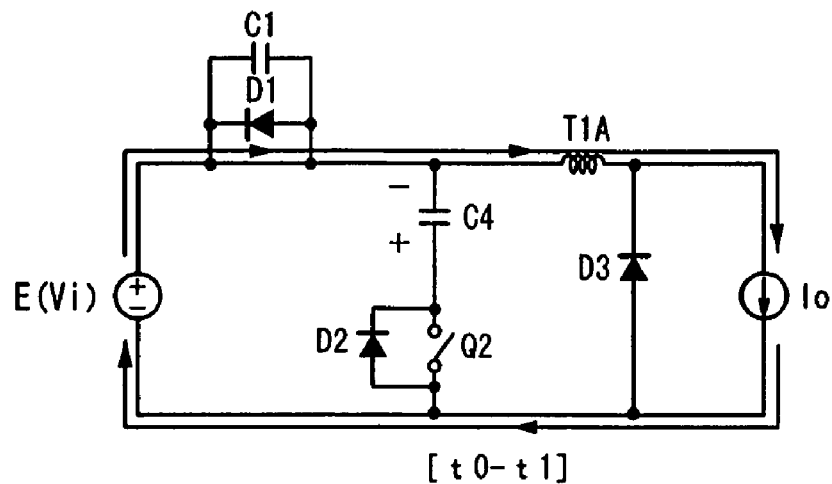
Figure 4B:
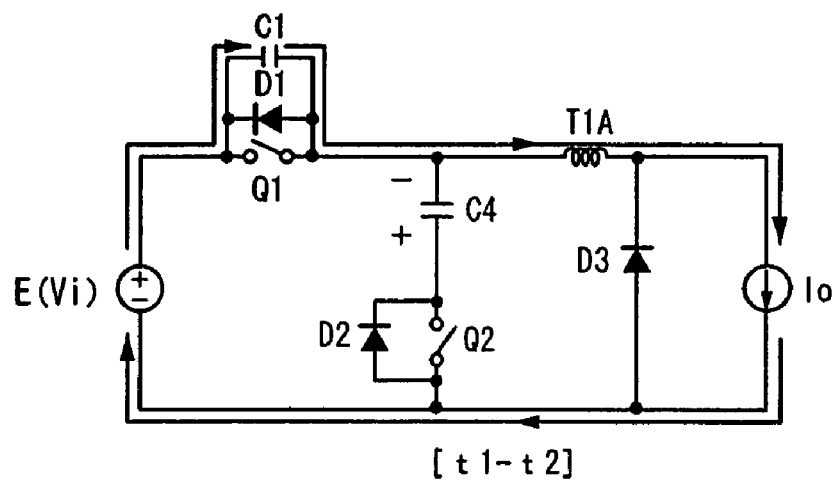

Referring to FIG. 3, the main switching element Q1 is on while the auxiliary switching element Q2 is off during period t0 to t1, and the constant current Io from the DC power supply E flows through the main switching element Q1 as shown in FIG. 4A. During this period, the voltage VQ2 has a value of "Vi+VC4". When the main switching element Q1 turns off at time t1, the capacitor C1 is charged by the constant current Io during period t1 to t2 as shown in FIG. 4B, and the voltage VQ1 increases to arrive at the voltage Vi at time t2 while the voltage VQ2 decreases to arrive at the voltage VC4.

Figure 4C:
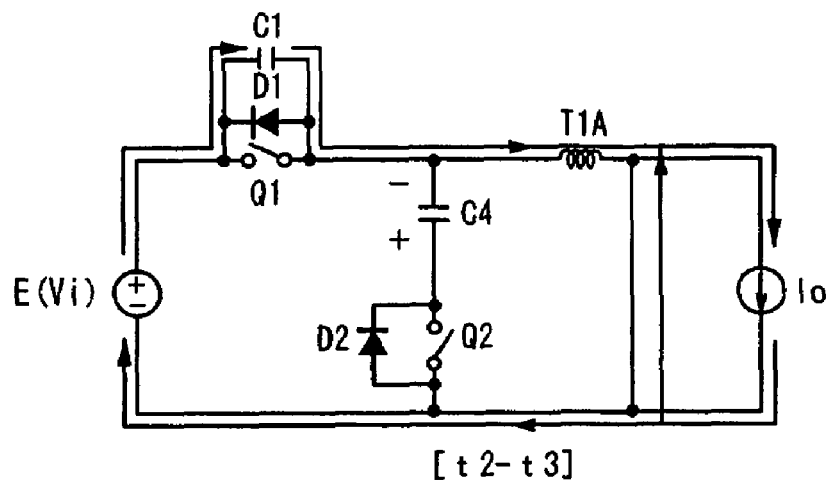

During period t2 to t3, the rectifier diode D3 conducts, and the current ID3 is caused to flow as shown in FIG. 4C. The capacitor C1 is charged by the current "Io−ID3", and the voltage VQ1 further increases to have a value of "Vi+VC4" at time t3 while the voltage VQ2 further decreases to have a value of zero and the voltage VT1 decreases to have a value of −VC4.

Figure 4D:
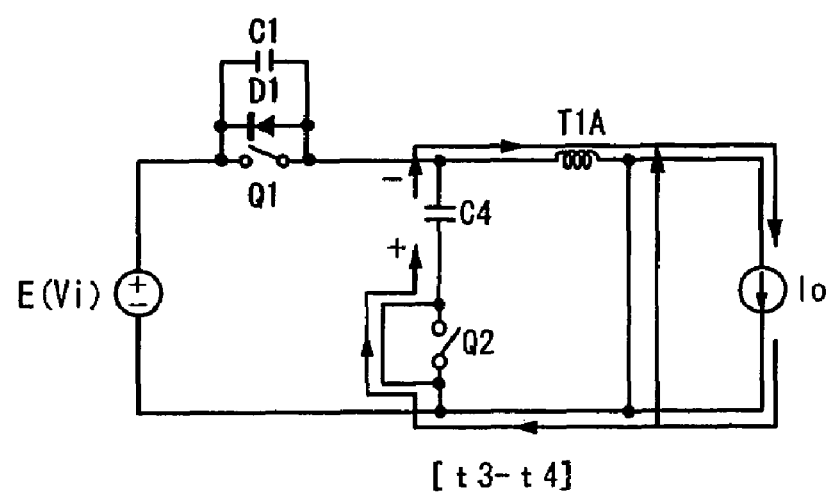

During period t3 to t4, the diode D2 conducts as shown in FIG. 4D, and the clamping capacitor C4 is charged, during which, by the operation of the first winding T1A of the resonance coil T1, the current IT1 decreases linearly, and the current ID3 of "Io−IT1" increases linearly as shown in FIG. 3. Then, "IQ1=−IT1" is maintained until the auxiliary switching element Q2 is turned off at time t6.

Figure 5A:
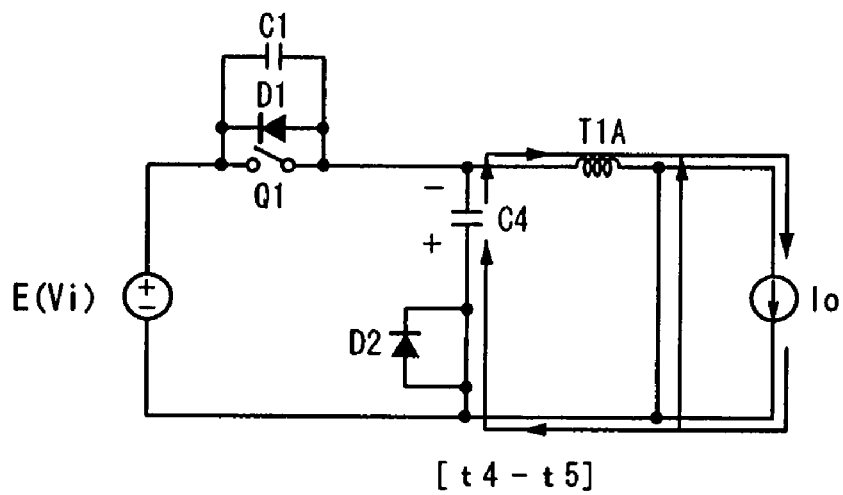

When the auxiliary switching element Q2 is turned on at time t4, the current IQ2 flowing through the diode D2 is caused to start flowing through the auxiliary switching element Q2 during period t4 to t5 as shown in FIG. 5A, during which, by the operation of the first winding T1A of the resonance coil T1, the current IT1 continues to decrease linearly, and the current ID3 of "Io–IT1" continues to increase linearly. At time t5, the current IQ2 has a value of zero, and the current ID3 arrives at Io. In this connection, the time t4 at which the auxiliary switching element Q2 is turned on may be set anywhere between the times t3 and t5 but is preferably set as close to the time 3 as possible in order to minimize conduction loss of the auxiliary switching element Q2.

Figure 5B:
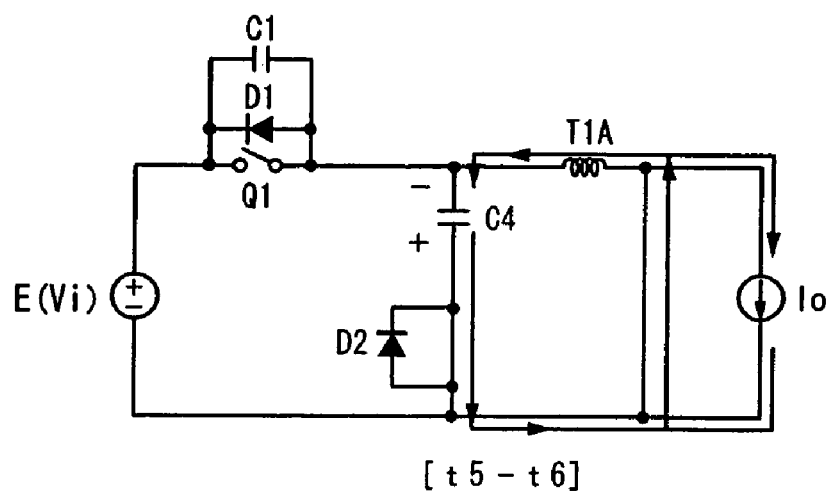

During period t5 to t6, by the operation of the first winding T1A of the resonance coil T1, the current IT1 increases linearly and starts to flow in the negative direction, and the current IQ2 of –IT1 starts to flow in the positive direction as shown in FIG. 5B. As a result, the capacitor C4 is discharged through the auxiliary switching element Q2. The current ID3 of "Io–IT1" increases linearly and exceeds Io. At the time t6, the current IT1 comes down to –IT1, and the current ID3 comes up to 2×Io.

Figure 5C:
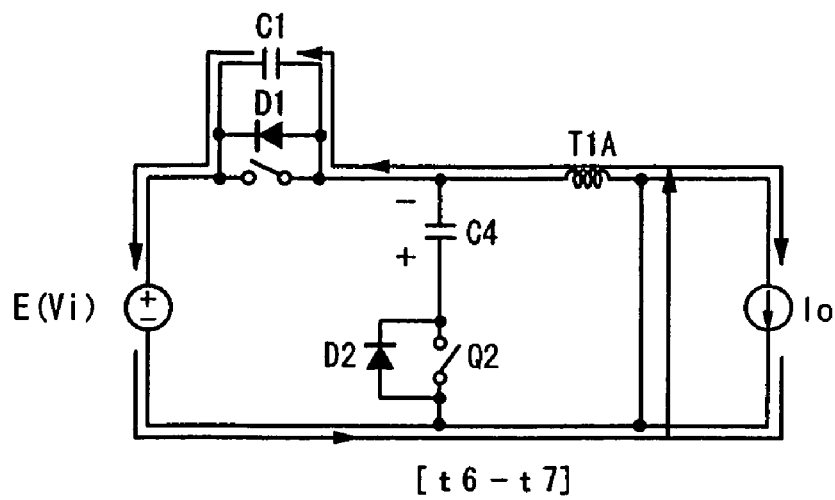

When the auxiliary switching element Q2 is turned off at the time t6, the current IT1, which has been flowing through the first winding T1A of the resonance coil T1, is caused to start flowing in such a direction as to discharge the capacitor C1 during period t6 to t7 as shown in FIG. 5C. By the operation of the first winding T1A of the resonance coil T1, the current IT1 increases linearly, and the current ID3 of "Io–IT1" starts to decrease linearly. And, due to the discharge of the capacitor C1, the voltage VQ1 starts to decrease, and the voltage VQ2 starts to increase. Then, "IQ1=IT1" is maintained until the main switching element Q1 is turned off again at time t0 of the next cycle. Since the currents IT1 and IQ1 have a value of –Io at the time t6, the current ID3 has a value of 2×Io. At time t7, the discharge of the capacitor C1 is finished, and the voltage VQ1 has a value of zero. At this time, the voltage VQ2 has increased to have a value of "Vi+VC4", and the voltage VT1 has increased to have a value of Vi.

Figure 5D:
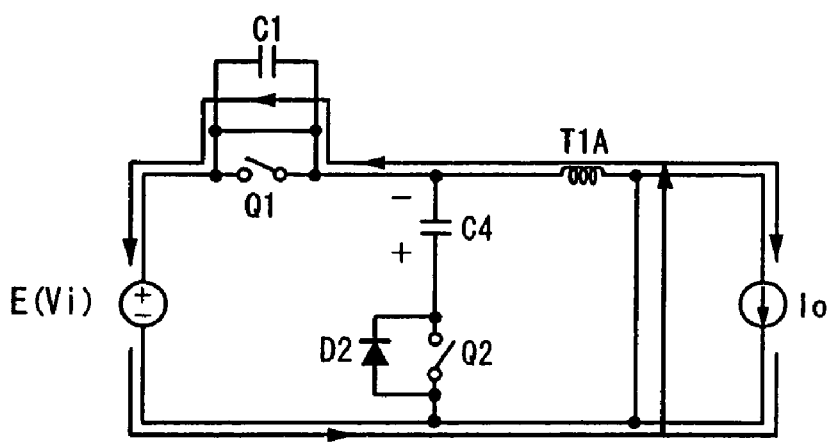

During period t7 and t8, the diode D1 conducts, and the current IQ1 starts to flow in the negative direction as shown in FIG. 5D. By the operation of the first winding T1A of the resonance coil T1, the current IT1 increases linearly and the current ID3 of "Io–IT1" decreases linearly.

Figure 6A:
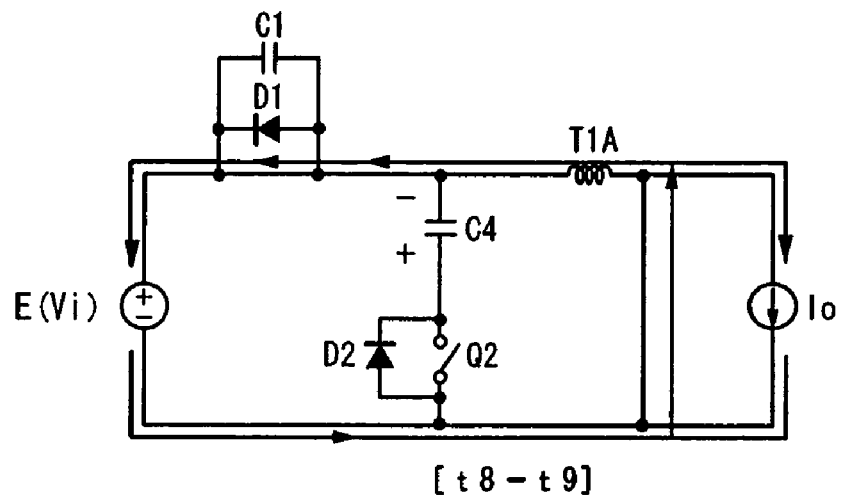

When the main switching element Q1 is turned on at time t8, the current, which has been flowing through the diode D1, is caused to start flowing through the main switching element Q1 as shown in FIG. 6A. By the operation of the first winding T1A of the resonance coil T1, the current IT1 increases linearly, and the current ID3 of "Io–IT1" decreases linearly. In this connection, the time t8 at which the main switching element Q1 is turned on may be set anywhere between the times t7 and t9 but is preferably set as close to the time 7 as possible in order to minimize conduction loss of the main switching element Q1. When the currents IT1 and IQ1 become zero at the time 9, the current ID3 becomes Io.

Figure 6B:
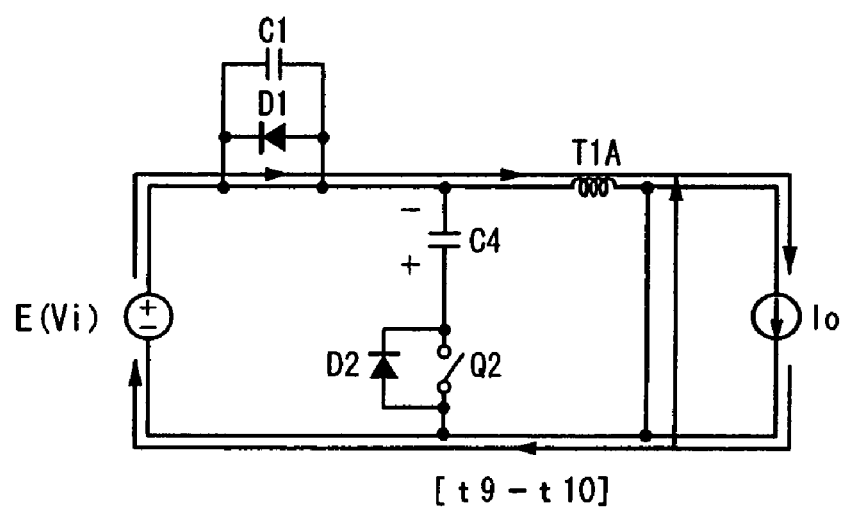

During period t9 to t10, for which current state is shown in FIG. 6B, by the operation of the first winding T1A of the resonance coil T1, the current IT1 increases linearly and start to flow in the positive direction, and the current ID3 of "I0–IT1" decreases linearly. When the currents IT1 and Io become zero at a time t10, the current ID3 becomes zero. At this time, the voltage VT1 becomes zero, and the voltages VD3 becomes Vi. Then, the process returns to time t0 and the cycle described above is repeated.

As described above, in the DC-DC converter 10, since the voltage VQ1 is zero when the main switching element Q1 is turned on (at the time t8), and since the voltage VQ2 is zero when the auxiliary switching element Q2 is turned on (at the time t4), a zero-voltage switching is realized at the main and auxiliary switching elements Q1 and Q2, thus significantly reducing switching loss. And, since the current ID3 decreases slowly (from the time t6 to the time t10), recovery current at the time of reverse recovery of the rectifier diode D3 can be significantly reduced.

Figure 7A:
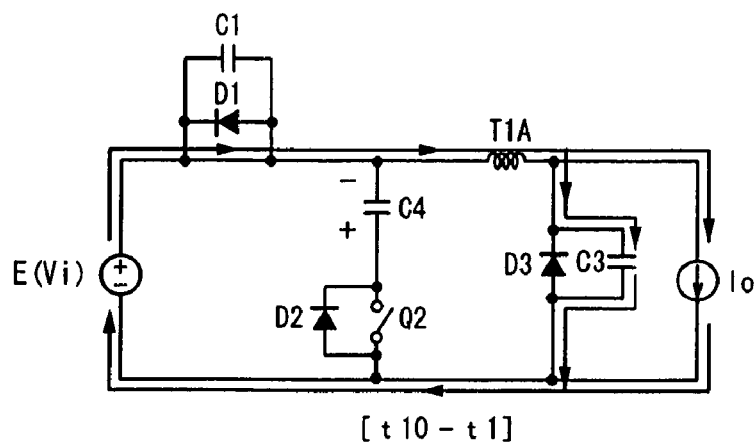
FIGS. 7A and 7B are respectively a current state diagram and a timing chart for the DC-DC converter of FIG. 1 in consideration of junction capacitance of a rectifier diode.
Figure 7B:
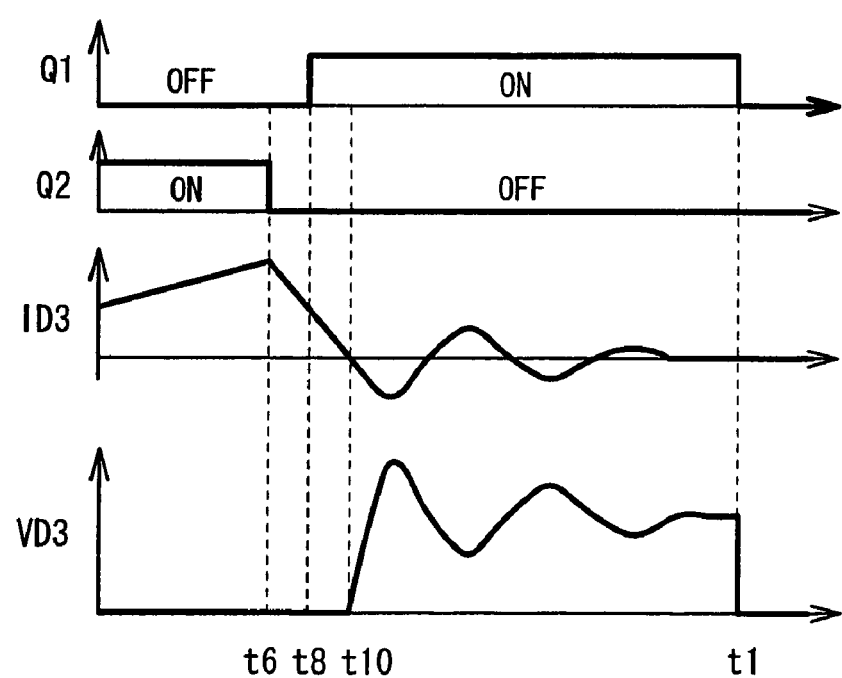

Influence of the junction capacitance C3 of the rectifier diode D3 will be described. The above discussion is based on the assumption that after the auxiliary switching element Q2 is turned off at the time t6, the current ID3 decreases linearly to shift into the steady state at which the current ID3 flowing through the rectifier diode D3 stays at zero (refer to FIG. 4A). However, in case the junction capacitance C3 of the rectifier diode D3 is not negligible in the circuitry of FIG. 2, the current ID3 continues to flow after the time t10 so as to repeatedly charge and discharge the junction capacitance C3 as shown in FIG. 7A, and ringing as shown in FIG. 7B arises due to resonance by the junction capacitance C3 and the resonance coil T1.

Figure 8A:
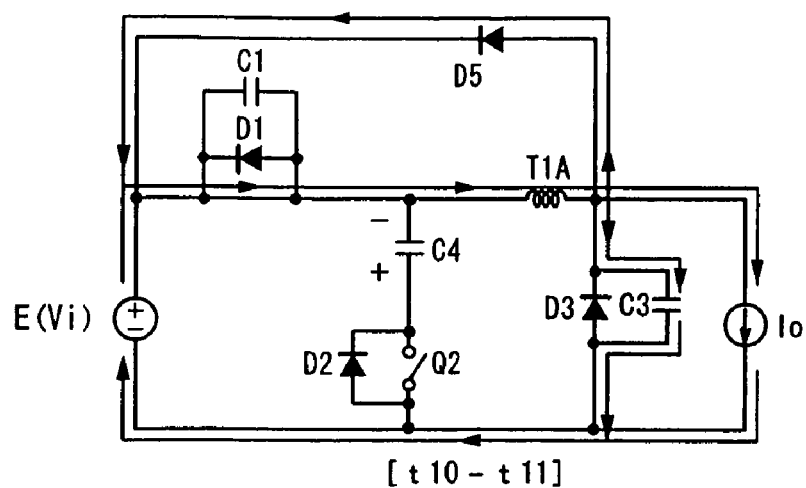
FIGS. 8A and 8B are current state diagrams for an operation of a second diode shown in FIG. 1.
Figure 8B:
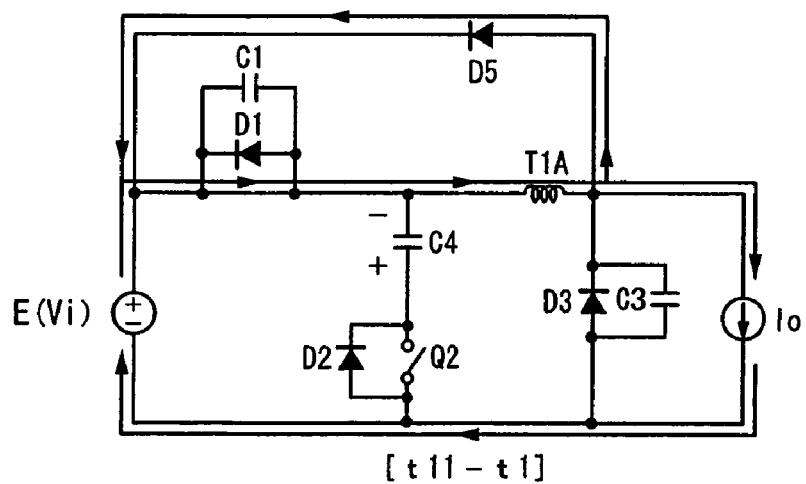
Figure 8C:
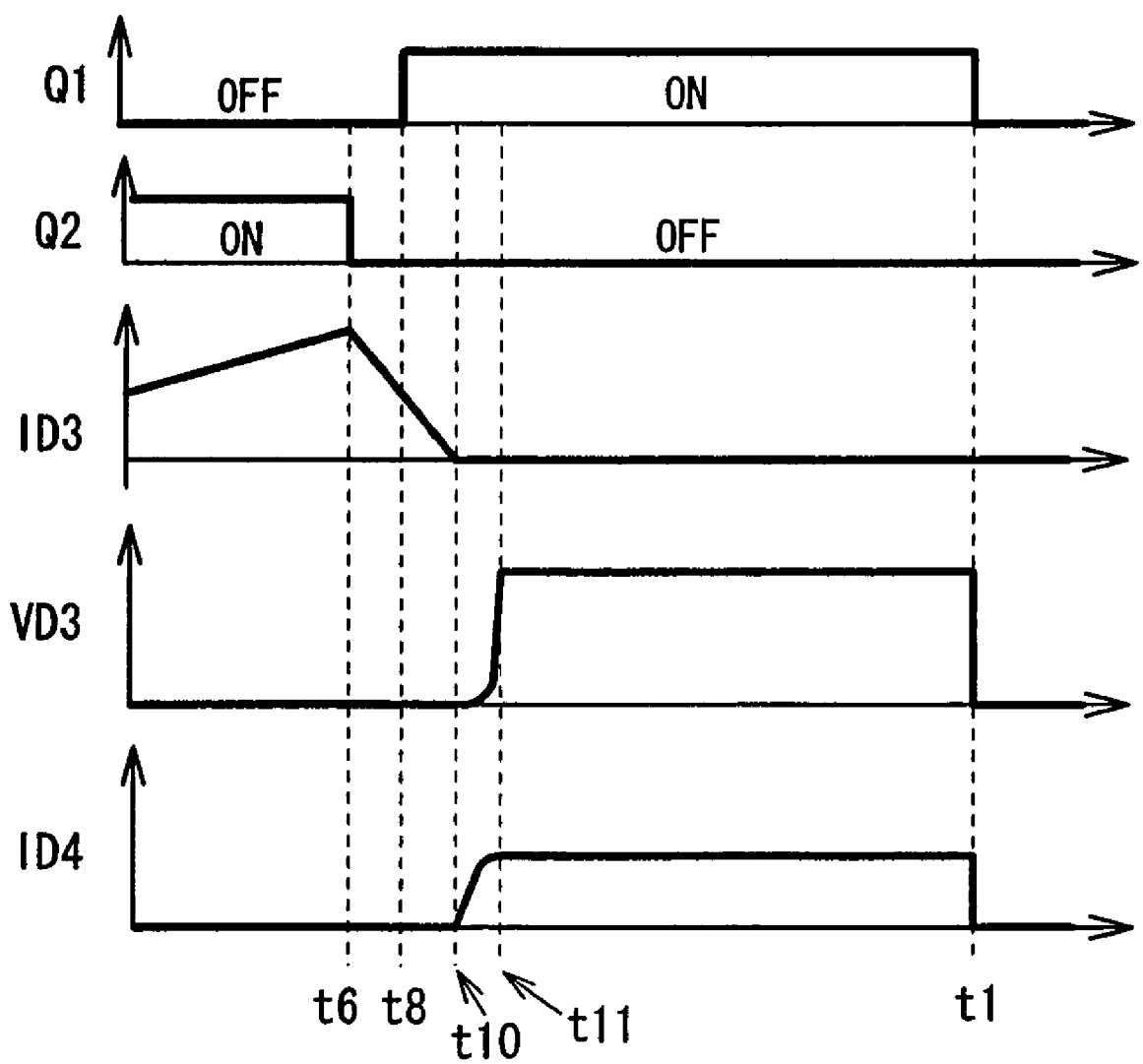
FIG. 8C is a timing chart for the same.

The DC-DC converter 10 according to the present embodiment incorporates the second diode 5 as shown in FIG. 1, whereby such a ringing is held from arising. Specifically, in the DC-DC converter 10, the energy of resonance is refluxed to the DC power supply E through the second diode D5 as shown in FIG. 8A. Consequently, the voltage VD3 of the rectifier diode D3 increases up to Vi during period t10 to t11 and has its voltage clamped thereat as shown in FIG. 8C, and the junction capacitance D3 is not charged and discharged after time t11 as shown in FIG. 8B. If the rectifier diode D3 has a sufficiently high withstand voltage, and if noise generation due to such a ringing need not be considered, then the second diode D5 does not have to be used.

An operation of the first diode D4 shown in FIG. 1 will be explained. The explanation is started with an assumption that the first diode D4 is not provided in the DC-DC converter 10, wherein a very low output voltage is gained on a duty ratio as low as, for example, nearly 0%. In such a case, since the period t7 to t10 is very short and therefore sufficient energy is not stored in the resonance coil T1, the capacitor C1 cannot be charged up to the voltage of "Vi+ VC4" during the period t1 to t3. Consequently, the clamping capacitor C4 cannot be charged sufficiently during the period t3 to t5, which causes the clamping capacitor C4 to be discharged during the period t5 to t6, thus the voltage VC4 of the clamping capacitor C4 is gradually decreased. With repletion of this cycle, the voltage VC4 of the clamping capacitor C4 is shifted into the reverse direction eventually, and therefore the resonance coil T1 cannot be reset, which blocks the normal operation of FIG. 3.

In the present embodiment, the first diode D4 is provided in the DC-DC converter 10 so as to be connected in parallel to the clamping capacitor C4 thereby preventing the voltage VC4 of the clamping capacitor C4 from shifting into the reverse direction. Thus, the DC-DC converter 10 is allowed to operate normally with an extremely low duty ratio as mentioned above (nearly 0%). If such a low duty ratio is not involved, then the DC-DC converter 10 does not have to include the first diode D4.

In the explanation so far, the choke coil L1 is supposed to have a sufficiently large inductance so as to function substantially as a constant current source. In an actual circuit, however, the choke coil L1 is not usually allowed to have such a large inductance for the reason of reduction in dimension and cost. Consequently, ripple currents are superposed in the current flowing through the choke coil L1, and the output capacitor is charged and discharged repeatedly thus generating an output ripple voltage. Such an output ripple voltage is reduced by the operation of the second winding T1B of the resonance coil T1 in the DC-DC converter 10, which is explained by comparing the operations of the conventional DC-DC converter shown in FIG. 11 and the conventional DC-DC converter 200 (disclosed in the aforementioned Japanese Patent Application Laid-Open No. 2003-189602) shown in FIG. 12 (it is assumed that the diodes have a forward voltage of substantially zero in FIGS. 9, 13A and 13B, and also in the following explanation).

Figure 12:
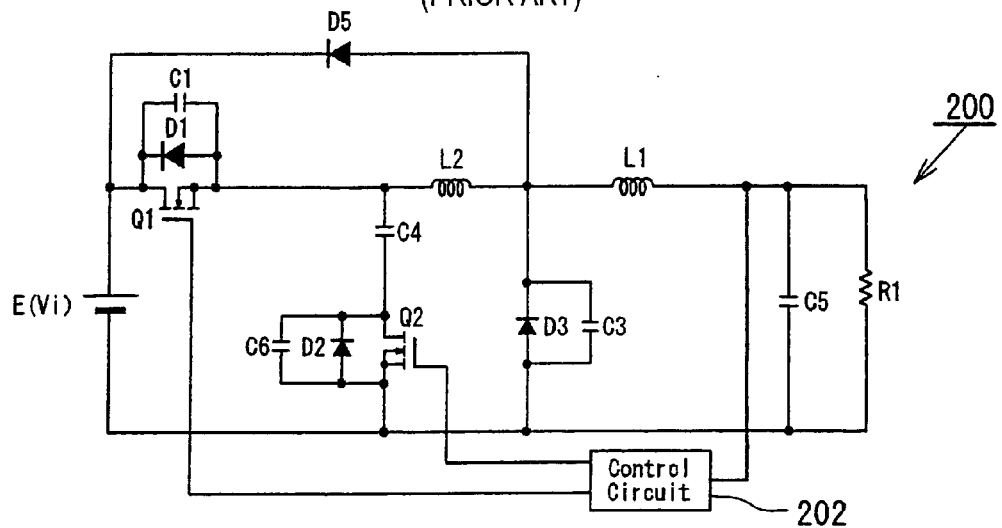
FIG. 12 is a circuit diagram of another conventional DC-DC converter.
Figure 13A:
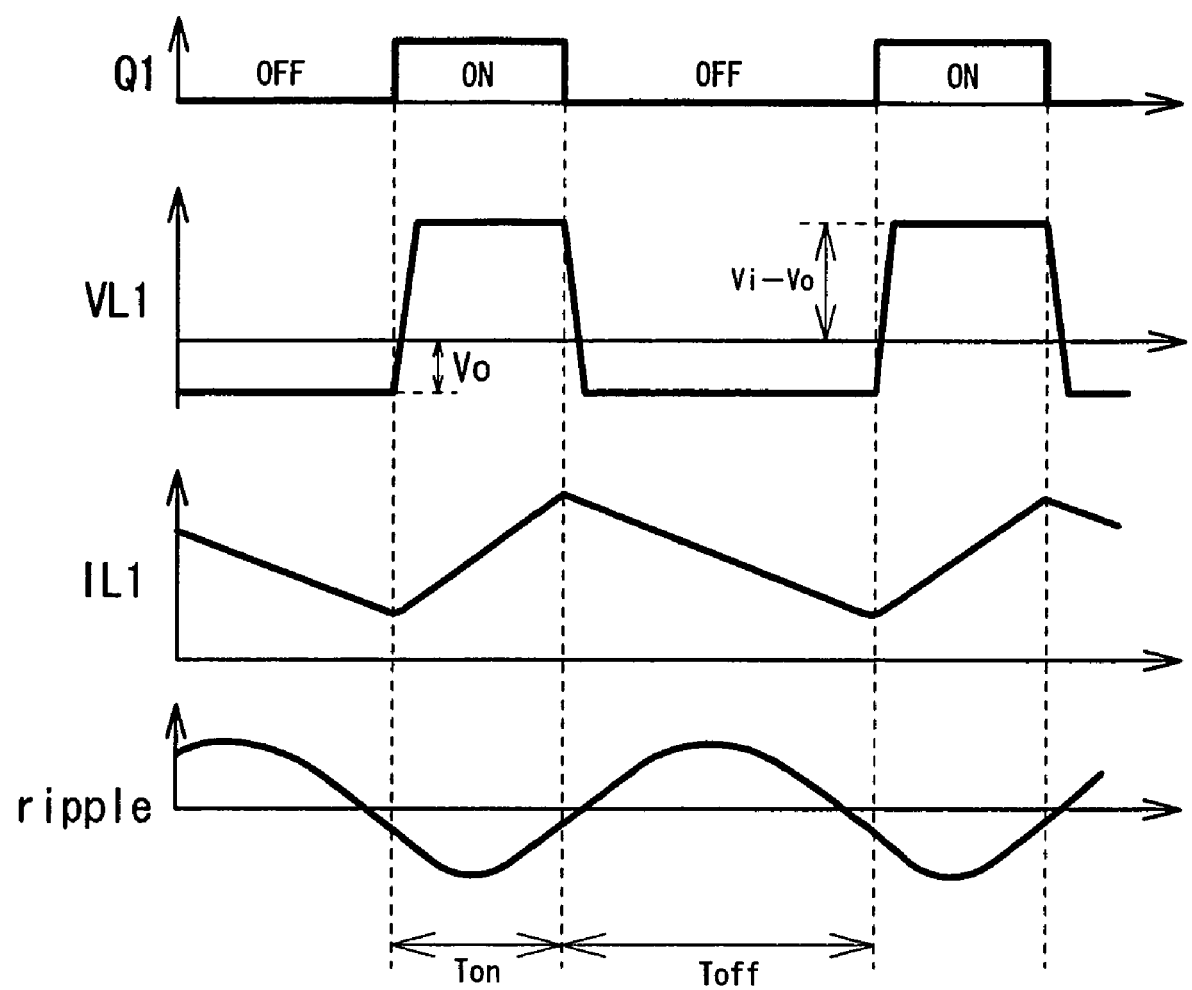
FIG. 13A is a timing chart for an output ripple voltage of the conventional DC-DC converter of FIG. 11.
Figure 13B:
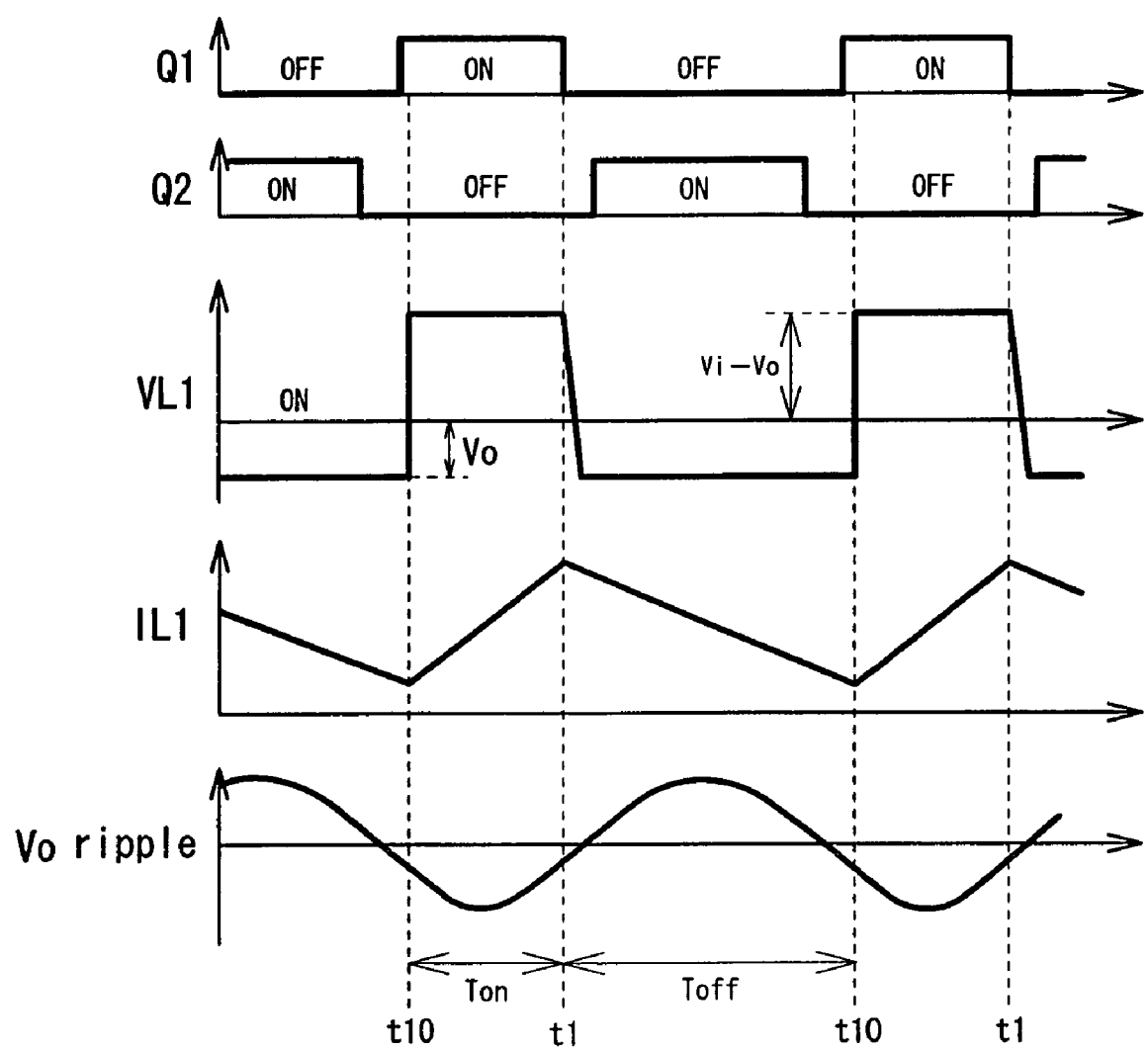
FIG. 13B is a timing chart for an output ripple voltage of the conventional DC-DC converter of FIG. 12.

In both FIGS. 13A and 13B, VL1 is a voltage applied across both terminals of the choke coil L1, IL1 is a current flowing through the choke coil L1, Vo$_{ripple}$ is an AC component (ripple voltage) of an output voltage Vo applied to the output capacitor C5. Referring to FIGS. 13A and 13B, in both of the DC-DC converters 100 and 200 (shown in FIGS. 10 and 12, respectively), when the switching element Q1 is turned on thereby electrically conducting the positive terminal of the DC power supply E and the choke coil L1 in period T$_{on}$, the electric potential at the connecting portion of the choke coil L1 and the rectifier diode D3 increases to reach Vi. Accordingly, a voltage of "Vi–Vo" is applied across both terminals of the choke coil L1, and the current IL1 increases linearly at a gradient of "(Vi–Vo)/L1" (where L1 is the inductance value of the choke coil L1). And, when the switching element Q1 is turned off thereby causing the rectifier diode D3 to conduct and causing the current IL1 to start commutating in period T$_{off}$, the electric potential at the connecting portion of the choke coil L1 and the rectifier diode D3 decreases to zero. Accordingly, a voltage of "–Vo" is applied across the both terminals of the choke coil L1, and the current IL1 decreases linearly at a gradient of "–Vo/L1".

In the DC-DC converter 100, the voltage VL1 rises slowly at the start of the period T$_{on}$ and the current IL1 starts to increase slowly as shown in FIG. 13A, while in the DC-DC converter 200, the voltage VL1 rises sharply at the time t10 as shown in FIG. 13B. Consequently, the change of the current IL1 during the period T$_{on}$ in FIG. 13B is larger than the change of the current IL1 during the period T$_{on}$ in FIG. 13A. Thus, the DC-DC converter 200 shown in FIG. 12 incurs an increase of the ripple voltage Vo $_{ripple}$ at the output capacitor C5 compared to the DC-DC converter 100 shown in FIG. 11, though the zero-switching of the switching element is realized by resonance action.

Figure 9:
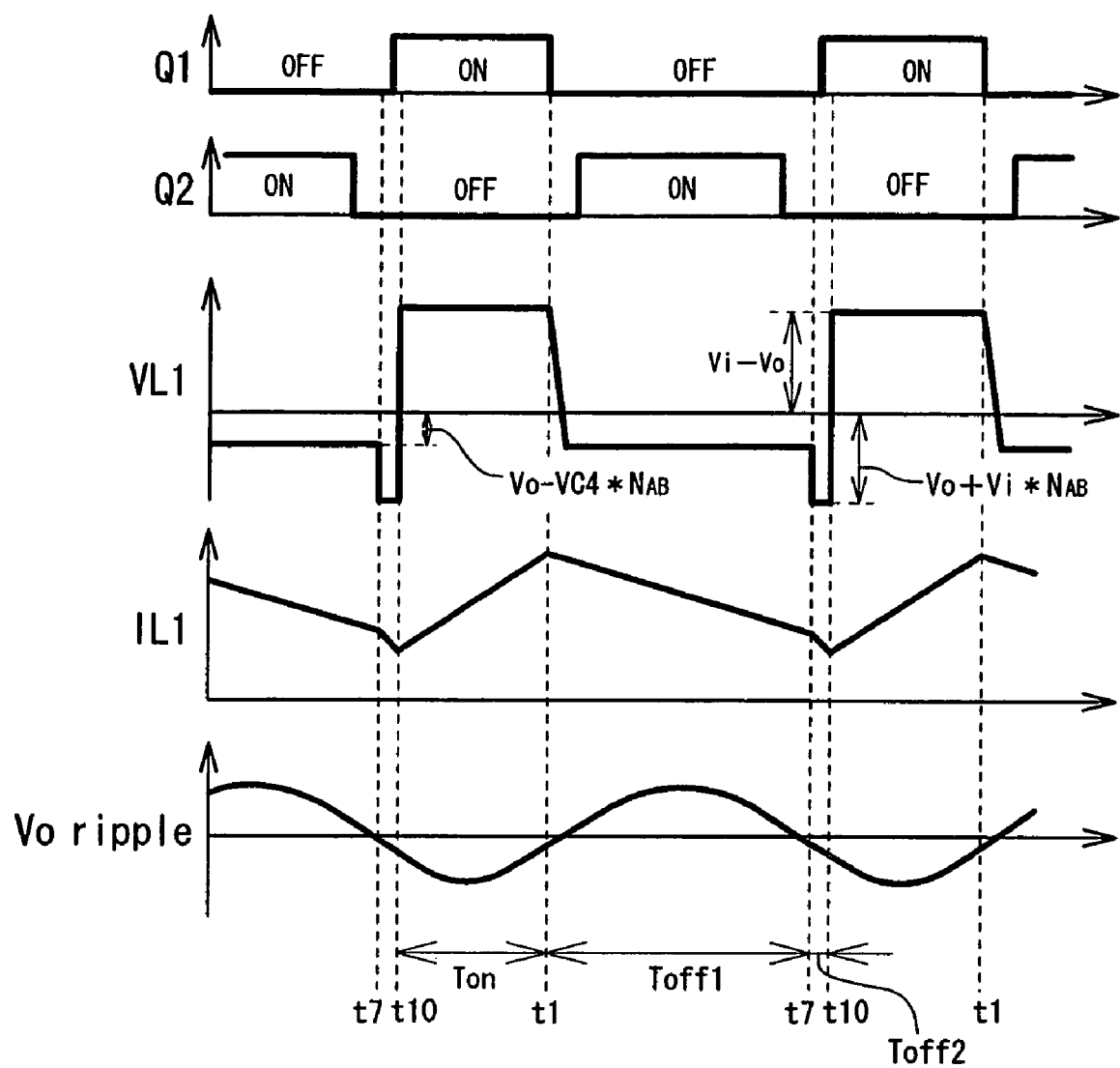
FIG. 9 is a timing chart for an output ripple voltage of the DC-DC converter of FIG. 1.

FIG. 9 is a timing chart for the DC-DC converter 10 according to the present embodiment, which corresponds to those of FIGS. 13A and 13B, and in which the performance characteristic is obtained without the capacitor C2 connected in parallel to the choke coil L1 (refer to FIG. 1) for the purpose of comparison with the DC-DC converters 100 and 200 described above.

As described above, in the DC-DC converter 10, the resonance coil T1 includes the first and second windings T1A and T1B which are magnetically connected to each other, and which are wound so as to define a predetermined turn ratio of N$_{AB}$ (=number of turns of the T1B/number of turn of the T1A) and to have respective polarities reversed. So, the operation during the period T$_{on}$ in FIG. 9 is similar to the operation during the period T$_{on}$ in FIG. 13B, but when the main switching element Q1 is turned off at the time t1 (the starting time of the period T$_{off1}$) in FIG. 9 and the voltage across the both terminals of the first winding T1A reaches –VC4 thereby causing the current IT1 flowing through the first winding T1A to start decreasing, a voltage of "VC4×N$_{AB}$" is generated at the connecting portion of the second winding T1B and the choke coil L1, and the voltage across the both terminals of the choke coil L1 comes to a value of "–(Vo–VC4×N$_{AB}$)". As a result, the current IL1 flowing through the choke coil L1 during the period T$_{off1}$ decreases linearly at a gradient of "–(Vo–VC4×N$_{AB}$)/L1" which is smaller than the gradient of "–Vo/L1" found at the period T$_{off}$ in FIGS. 13A and 13B.

Also, when the auxiliary switching element Q2 is turned off during the period T$_{off2}$ in FIG. 9 and the voltage across the both terminals of the first winding T1A reaches Vi thereby causing the current IT1 flowing through the first winding T1A to start increasing, a voltage of "–Vi×N$_{AB}$" is generated at the connecting portion of the second winding T1B and the choke coil L1, and the voltage across the both terminals of the choke coil L1 comes to a value of "–(Vo+Vi×N$_{AB}$)". As a result, the current IL1 flowing through the choke coil L1 during the period T$_{off2}$ decreases linearly at a gradient of "–(Vo+Vi×N$_{AB}$)/L1" which is larger than the gradient of "–Vo/L1" found at the period T$_{off}$ in FIGS. 13A and 13B. However, since the period T$_{off2}$ is usually shorter than the period T$_{off1}$, and since the magnitude of the output ripple voltage Vo is subject to the behavior of the current IL1, the ripple current of the current IL1 is generally smaller than the ripple current of the current IL1 represented in FIGS. 13A and 13B, and the output voltage Vo ripple is also reduced.

Figure 11:
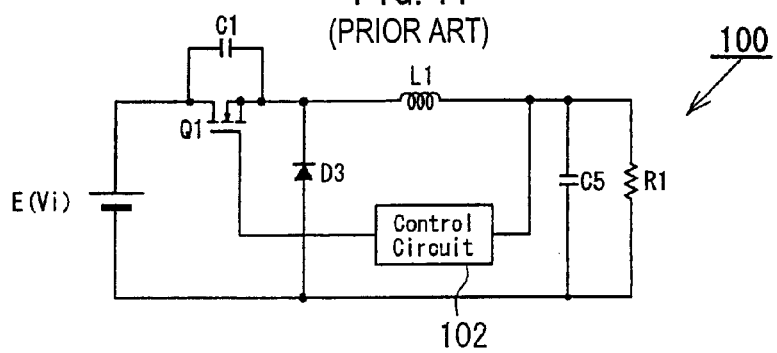
FIG. 11 is a circuit diagram of a conventional DC-DC converter.

Thus, in the DC-DC converter 10 according to the present embodiment, the output ripple voltage Vo $_{ripple}$ of the output capacitor C5 is reduced compared to the DC-DC converters 100 and 200 shown in FIGS. 11 and 12, respectively, and a stable output voltage is gained without increasing the capacitance of the output capacitor C5 and without addition of a low-pass filter. In this connection, the gradient of the current IL1 during the period T$_{off1}$ can be reduced by increasing the turn ratio N$_{AB}$ of the resonance coil T1, but this causes the gradient of the current IL1 during the period T$_{off2}$ to be increased. Accordingly, the turn ratio N$_{AB}$ must be determined in consideration of the time ratio of the T$_{off1}$ and T$_{off2}$ so that the current IL1 does not behave dominantly during the period T$_{off2}$.

Further, in the DC-DC converter 10 according to the present embodiment, the capacitor C2 is connected in parallel to the choke coil L1 thereby easing a sharp rise of the voltage VL1 at the time t10 of FIG. 9, which results in further reduction of the ripple voltage of the output capacitor C5.

The DC-DC converter 10 in the first embodiment described above is constituted by a step-down circuitry. The present invention, however, is not limited to such a circuitry but may be constituted by other circuitries, and thereby similar effects can be duly achieved.

Figure 10:
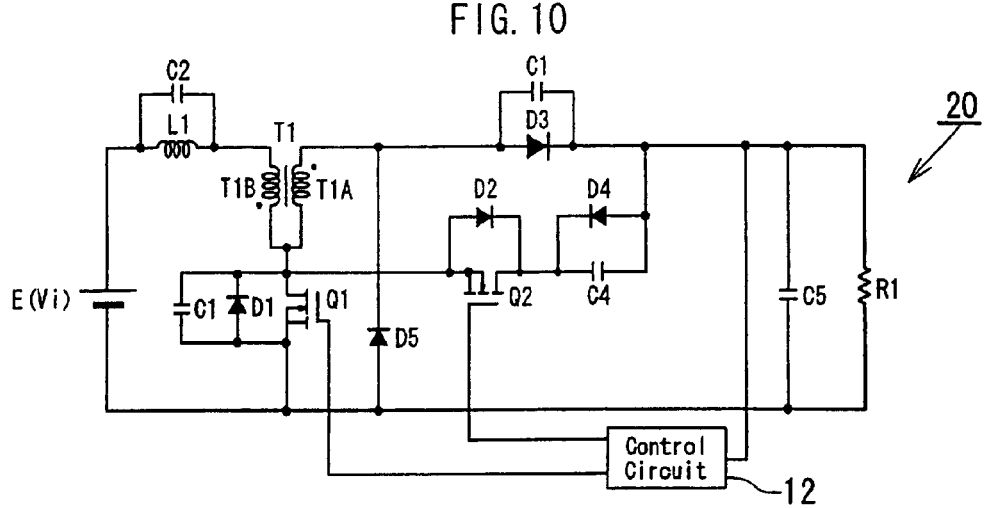
FIG. 10 is a circuit diagram of a step-up DC-DC converter according to a second embodiment of the present invention.

A second embodiment of the present invention will hereinafter be described as another example with reference to FIG. 10. Referring to FIG. 10, a DC-DC converter 20 according to the second embodiment is a step-up DC-DC converter, in which one terminal of a choke coil L1 is connected to the positive terminal of a DC power supply E and the other terminal of the choke coil L1 is connected to one terminal of a second winding T1B of a resonance coil T1, the other terminal of the second winding T1B is connected to the drain terminal of a main switching element Q1 and to one terminal of a first winding T1A of the resonance coil T1, the other terminal of the first winding T1A is connected to the anode terminal of a rectifier diode D3, the cathode terminal of the rectifier diode D3 is connected to one terminal of an output capacitor C5, the source terminal of the main switching element Q1 and the other terminal of the output capacitor C5 are connected to the negative terminal of the DC power supply E, and a series circuit consisting of a clamping capacitor C4 and an auxiliary switching element Q2 is connected between the one terminal of the output capacitor C5 and a connecting portion of the main switching element Q1 and the first winding T1A.

Further, in the DC-DC converter 20, a first diode D4 is connected in parallel to the clamping capacitor C4, a second diode D5 is connected between the negative terminal of the DC power supply E and a connecting portion of the resonance coil T1 and the rectifier diode D3. Also, the first and second windings T1A and T1B of the resonance coil T1 are magnetically connected to each other, and are wound so as to define a predetermined turn ratio of $N_{AB}$ (=number of turns of the T1B/number of turn of the T1A) and to have respective polarities reversed.

The DC-DC converter 20 described above operates in the same way as the DC-DC converter 10 according to the first embodiment, achieves zero-voltage switching, and also reduces ripple currents superposed in the current flowing through the choke coil L1 thereby reducing an output ripple voltage of the DC power supply E.

While the present invention has been illustrated and explained with respect to specific embodiments thereof, it is to be understood that the present invention is by no means limited thereto but encompasses all changes and modifications that will become possible within the scope of the appended claims.

What is claimed is:

1. A DC-DC converter comprising:
   a main switching element;
   an auxiliary switching element;
   a rectifier diode;
   a choke coil;
   an output capacitor;
   a clamping capacitor;
   a first diode connected in parallel to the clamping capacitor; and
   a resonance coil,
   wherein the resonance coil includes first and second windings, the main switching element has one terminal thereof connected to one terminal of a DC power supply and has an other terminal thereof connected to one terminal of the first winding, the choke coil has one terminal thereof connected to one terminal of the second winding and has an other terminal thereof connected to one terminal of the output capacitor, the rectifier diode has one terminal thereof connected to a connecting portion of the first and second windings and has an other terminal thereof connected to an other terminal of the output capacitor and also to an other terminal of the DC power supply, and a series circuit including the auxiliary switching element and the clamping capacitor is provided between the other terminal of the DC power supply and a connecting portion of the main switching element and the first winding, whereby a step-down operation is performed.

2. A DC-DC converter according to claim 1, wherein the DC-DC converter further comprises a second diode provided between the DC power supply and a connecting portion of the first winding of the resonance coil and the rectifier diode.

3. A DC-DC converter according to claim 1, wherein the DC-DC converter further comprises a capacitor connected in parallel to the main switching element.

4. A DC-DC converter according to claim 1, wherein the DC-DC converter further comprises a capacitor connected in parallel to the choke coil.

5. A DC-DC converter comprising:
   a main switching element;
   an auxiliary switching element;
   a rectifier diode;
   a choke coil;
   an output capacitor;
   a clamping capacitor;
   a first diode connected in parallel to the clamping capacitor: and
   a resonance coil,
   wherein the resonance coil includes first and second windings, the choke coil has one terminal thereof connected to one terminal of a DC power supply and has an other terminal thereof connected to one terminal of the second winding, the rectifier diode has one terminal thereof connected to one terminal of the first winding and has an other terminal thereof connected to one terminal of the output capacitor, the main switching element has one terminal thereof connected to a connecting portion of the first and second windings and has an other terminal thereof connected to an other terminal of the output capacitor and also to the other terminal of the DC power supply, and a series circuit including the auxiliary switching element and the clamping capacitor is provided between the one terminal of the output capacitor and a connecting portion of the main switching element and the first winding, whereby a step-up operation is performed.

6. A DC-DC converter according to claim 5, wherein the DC-DC converter further comprises a second diode provided between the DC power supply and a connecting portion of the first winding of the resonance coil and the rectifier diode.

7. A DC-DC converter according to claim 5, wherein the DC-DC converter further comprises a capacitor connected in parallel to the main switching element.

8. A DC-DC converter according to claim 5, wherein the DC-DC converter further comprises a capacitor connected in parallel to the choke coil.

* * * * *